United States Patent [19]
Imaseki et al.

[11] Patent Number: 5,103,925
[45] Date of Patent: Apr. 14, 1992

[54] REAR WHEEL STEERING CONTROL SYSTEM FOR VEHICLE

[75] Inventors: Takashi Imaseki; Minoru Tamura; Toru Iwata; Yuichi Fukuyama, all of Kanagawa, Japan

[73] Assignee: Nissan Motor Company, Limited, Japan

[21] Appl. No.: 574,685

[22] Filed: Aug. 30, 1990

[30] Foreign Application Priority Data

Sep. 4, 1989 [JP] Japan ............... 1-230147

[51] Int. Cl.⁵ .............................. B62D 5/06
[52] U.S. Cl. .................... 180/140; 180/142; 280/91; 364/424.05
[58] Field of Search ........... 180/140, 142, 132; 280/91; 364/424.01, 424.05

[56] References Cited

U.S. PATENT DOCUMENTS

| | | | |
|---|---|---|---|
| 4,669,744 | 6/1987 | Sano et al. | 180/140 X |
| 4,939,653 | 7/1990 | Tsurumiya et al. | 180/140 X |
| 4,949,265 | 8/1990 | Eguchi et al. | 364/424.05 |
| 4,971,174 | 11/1990 | Abe et al. | 180/140 |
| 4,971,175 | 11/1990 | Hamada et al. | 180/140 |

FOREIGN PATENT DOCUMENTS

| | | |
|---|---|---|
| 3904920 | 8/1989 | Fed. Rep. of Germany . |
| 57-60974 | 4/1982 | Japan . |
| 61-135865 | 6/1986 | Japan . |
| 61-241277 | 10/1986 | Japan . |
| 62-71761 | 4/1987 | Japan . |
| 63-112280 | 5/1988 | Japan . |
| 63-15181 | 6/1988 | Japan . |
| 162375 | 7/1988 | Japan ............ 180/140 |
| 95968 | 4/1989 | Japan ............ 180/140 |
| 109176 | 4/1989 | Japan ............ 180/140 |
| 2148812 | 6/1985 | United Kingdom . |

*Primary Examiner*—Charles A. Marmor
*Assistant Examiner*—Alan M. Kagen
*Attorney, Agent, or Firm*—Lowe, Price, LeBlanc & Becker

[57] ABSTRACT

Steering angle for rear wheels of a vehicle is controlled by determining a rear wheel steering angle in a preselected relation to a steered angle of a steering wheel. A correction factor for the rear wheel steering angle is based on a difference in rotational speed between front and rear wheels induced during turning. The correction factor for rear wheel steering angle is maintained at the value it had prior to braking to cancel the effect of braking slips on the determination of the rear wheel steering angle to improve steering stability.

18 Claims, 3 Drawing Sheets

REAR WHEEL STEERING CONTROL SYSTEM FOR VEHICLE

BACKGROUND OF THE INVENTION

1. Technical Field

The present invention relates generally to a steering control system for a vehicle. More particularly, the invention relates to an improved rear wheel steering system for a vehicle which is adapted for detecting slip of driven wheels to determine a rear wheel sterring angle based thereon.

2. Background Art

It is well known in the art that four-wheel steered (4WS) vehicles are adapted for providing cornering forces on rear wheels during turns without slipping to improve turning stability.

A Japanese Patent First Publication No. 57-60974 discloses a rear wheel steering system. This system is operable to detect acceleration or centripetal force acting on a vehicle body during turns to steer rear wheels based thereon to the same phase as a steered angle of front wheels in the case of a front-wheel drive (FWD) vehicle or to a phase opposite the front wheels in the case of a rear-wheel drive (RWD) vehicle for preventing a spin of the FWD vehicle which is caused by driven wheel slippage during turning with acceleration or, in the case of rear-wheel drive vehicles, for preventing drift-out.

The above prior art steering system is however provided with an acceleration sensor which is installed on a part of the vehicle body to detect acceleration including an unnecessary component induced by vehicle motion such as vertical displacement or pitching due to uneven road or acceleration, resulting in unsuitable rear wheel steering control.

For avoiding such drawbacks, a Japanese Patent First Publication No. 62-71761 discloses a rear wheel steering system which controls a steering operation for rear wheels based on a difference in rotational speeds between driven and compliance wheels to prevent spin or drift-out due to driven wheel slippage (i.e., due to rotational speed of the driven wheels being higher than that of the compliance wheels) during turning with acceleration.

However, the prior art rear wheel steering control system is responsive to a difference in rotational speeds between the driven and compliance wheels during turns to correct a steering ratio (i.e., a ratio of the steering angle of the rear wheels to the front wheels) based thereon and controls rear wheel steering according to the corrected steering angle ratio. Thus, this system has a drawback in that there is a tendency for the rear wheel steering control to become unstable when a brake pedal is depressed during turning.

Braking forces of the front and rear wheels are normally not constant when a braking occurs and any of the wheels may sometimes lock early. This results in a difference in rotational speeds between the driven and compliance wheels due to the wheel locking (hereinafter, this difference in rotational speeds due to braking is referred to as braking slips). As a result of braking slips in addition to driven wheel slip being detected as a rotational speed difference between the driven and compliance wheels, a steering ratio set according to such a detected value becomes unsuitable, further reducing steering stability during turns.

SUMMARY OF THE INVENTION

It is accordingly one object of the present invention to avoid the disadvantages of the prior art.

It is another object of the invention to provide a control system for steering rear wheels which prevents a change in a rear wheel steering angle due to braking slips to ensure steering stability when braking occurs during turns.

According to one aspect of the present invention, there is provided a rear wheel steering control system for a vehicle which comprises a first means for monitoring a steered angle of front wheels to provide a signal indicative thereof, a second means for monitoring rotational speeds of wheels respectively to determine a difference in rotational speed between the front and rear wheels and providing a signal indicative thereof, a third means responsive to the signal from the second means to determine a correction value for a rear wheel steering angle based on the magnitude of the difference in rotational speed between the front and rear wheels, the third means providing a rear wheel target steering angle based on the correction value and the steered angle of the front wheels to provide a signal indicative thereof, a fourth means for monitoring braking operation to provide a signal indicative thereof, a fifth means responsive to the signal from the fourth means for stopping a rear wheel steering control cycle to hold the correction value to a value prior to the braking operation, and a sixth means for controlling an actual steering angle of the rear wheels according to the rear wheel target steering angle.

According to another aspect of the invention, there is provided a rear wheel steering control system for a vehicle which comprises a first means for detecting a steered angle of front wheels to provide a signal indicative thereof, a second means responsive to the signal from the first means to determine a rear wheel steering angle in a preselected relation to the steered angle of the front wheels, a third means for monitoring rotational speeds of wheels respectively to determine a difference in rotational speeds between the front and rear wheels and providing a signal indicative thereof, a fourth means responsive to the signal from the third means to determine a correction value for the rear wheel steering angle determined by the second means, based on the magnitude of the difference in rotational speeds between the front and rear wheels, the fourth means adjusting the rear wheel steering angle based on the correction value to provide a rear wheel target steering angle and providing a signal indicative thereof, a fifth means for monitoring braking operation to provide a signal indicative thereof, a sixth means responsive to the signal from the fifth means to hold the correction value to a value prior to the braking operation, and a seventh means for controlling an actual steering angle of the rear wheels according to the rear wheel target steering angle.

DESCRIPTION OF THE PREFERRED EMBODIMENT

Figure 1:
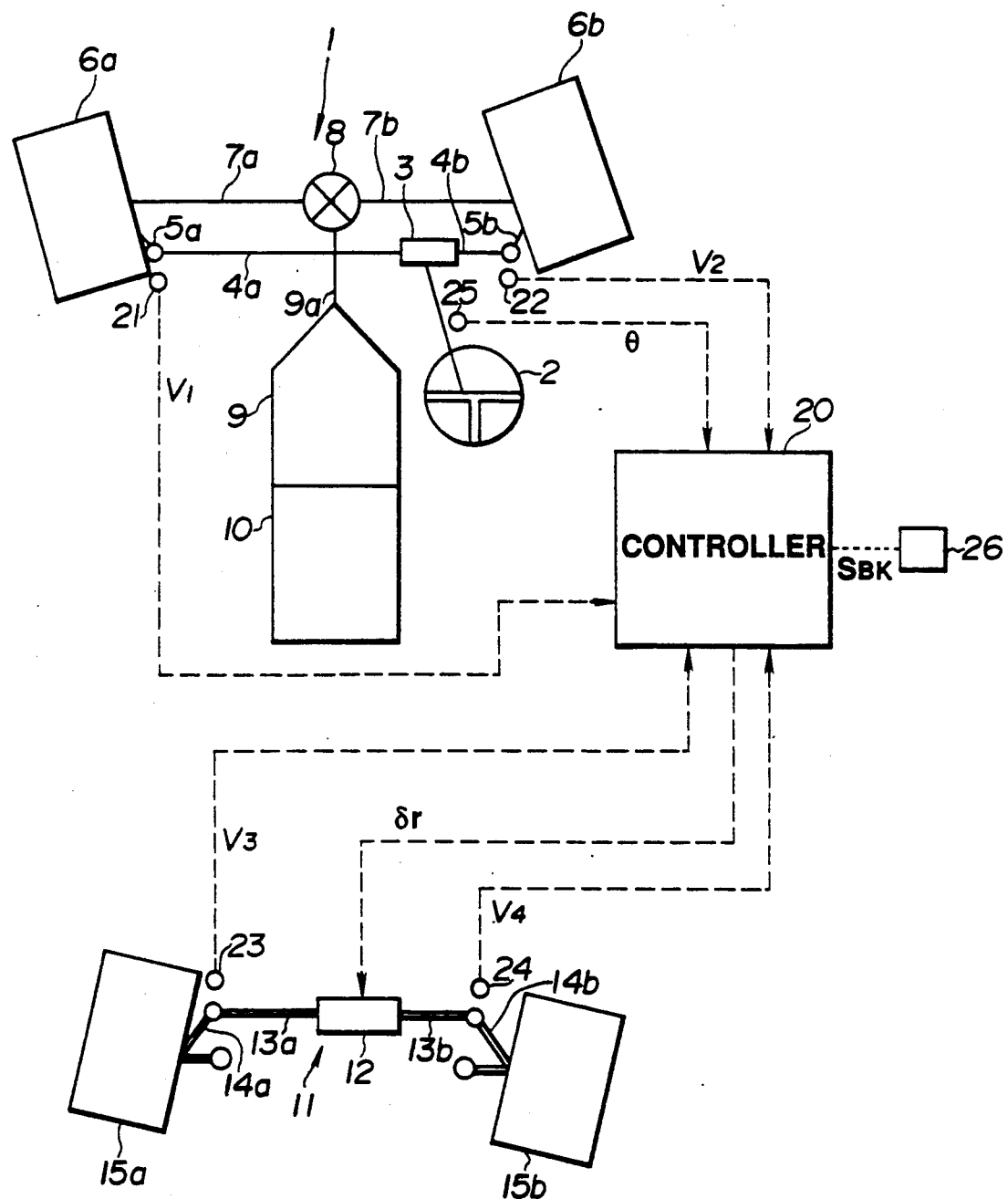
FIG. 1 is a block diagram of a steering system according to the present invention incorporated in a front-wheel drive vehicle.

Referring now to the drawings, particularly to FIG. 1, a steering control system according to the present invention is shown which is incorporated in a front-wheel drive (FWD) vehicle. This system includes generally a front wheel steering unit 1, a rear wheel steering unit 11, and a steering controller 20 operable to detect torque of driven wheels and to adjust a rear wheel target steering angle.

The front wheel steering unit 1 includes a steering wheel 2, a rack-and-pinion steering gear 3, relay rods 4a and 4b, and knuckle arms 5a and 5b. The rack-and-pinion steering gear 3 converts rotational motion of the steering wheel 2 into stroke motion to laterally displace the relay rods 4a and 4b for steering front wheels 6a and 6b. Drive shafts 7a and 7b are connected to the front wheels 6a and 6b respectively to transmit drive torque thereto provided from an engine 10. Each drive shaft is connected to an output shaft 9a of a transmission 9 through a differential gear 8.

The rear wheel steering unit 11 includes a hydraulic cylinder 12 such as a spring centered double acting hydraulic pressure cylinder, tie rods 13a and 13b, and rear knuckle arms 14a and 14b coupling intermediate the tie rods and rear wheels 15a and 15b respectively. The hydraulic cylinder 12 hydraulically communicates with an electromagnetic proportional pressure control valve (not shown) which is connected to a pressure source (not shown). The control valve is responsive to a rear wheel steering angle signal $\delta r$ derived from the steering controller 20 to provide hydraulic pressure to either of the chambers in the hydraulic cylinder 12, displacing the tie rods 13a and 13b to steer rear wheels 15a and 15b in a preselected direction.

The steering control system further includes a left front wheel rotational speed sensor 21 for determining speed $V_1$ of the left front wheel, a right front wheel rotational speed sensor 22 for determining speed $V_2$ of the right front wheel, a left rear wheel rotational speed sensor 23 for determining speed $V_3$ of the left rear wheel, a right rear wheel rotational speed sensor 24 for determining speed $V_4$ of the right rear wheel, a steering angle sensor 25 for determining a steered angle $\theta$ of the steering wheel 2, and a brake sensor 26 for detecting depression or braking operation of a brake pedal (not shown) to provide a braking operation signal $S_{BK}$ to which a brake lamp switch may be applicable (which outputs a 'H' level signal in operation). These sensors provide signals indicative of detected parameters to the steering controller 20, which calculates a rear wheel target steering angle $\delta_r$ based on those signals.

Figure 2:
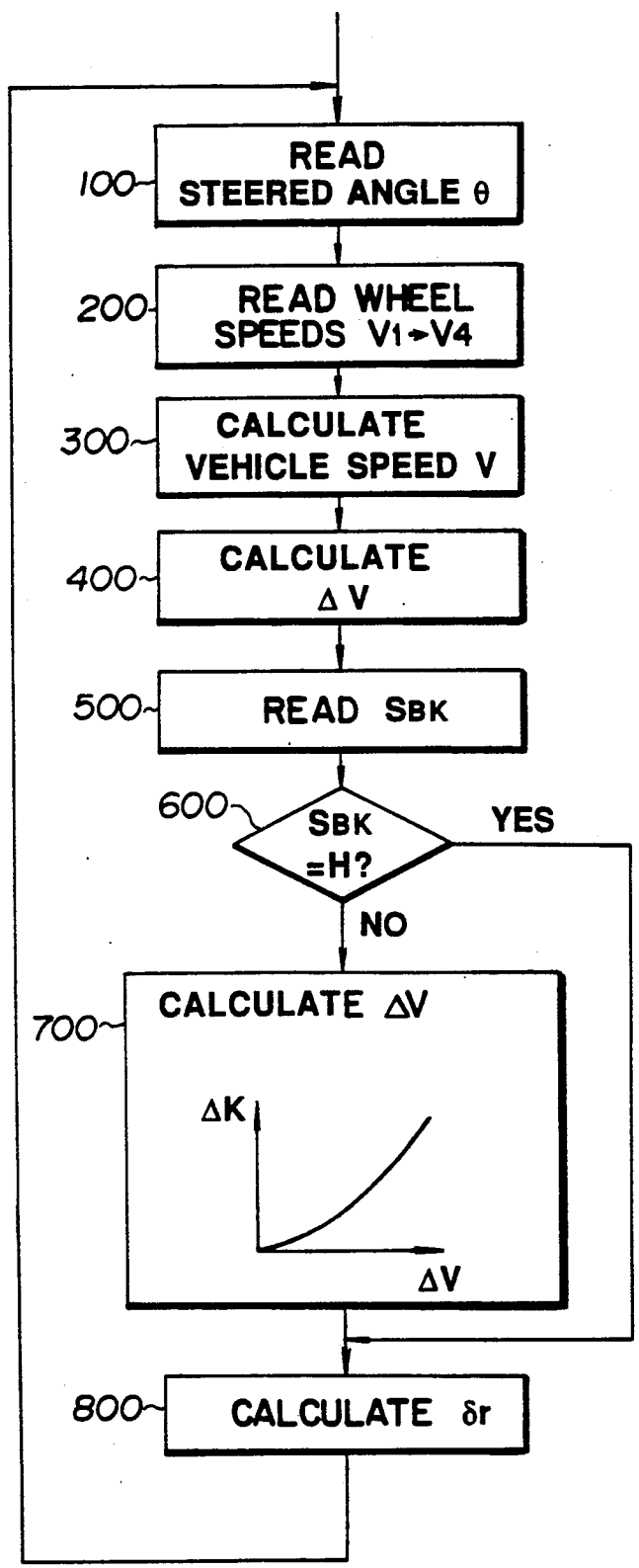
FIG. 2 is a flowchart of a sequence of logical steps carried out by a rear wheel steering control system of the invention.

Referring to FIG. 2, a flowchart of a program or sequence of logical steps performed by the steering controller 20 is shown. After entering the program, in step 100 the steering controller 20 reads the steered angle $\theta$ from the steered angle sensor 25. The routine then proceeds to step 200 wherein the wheel speeds $V_1$ to $V_4$ are supplied by rotational speed sensors 21 to 24 to the steering controller 20. The routine then proceeds to step 300 wherein vehicle speed V is determined based on the wheel speeds derived in step 200 according to the following equation.

$$V=(V_1+V_2+V_3+V_4)/4 \quad (1)$$

Subsequently, the routine proceeds to step 400 wherein a difference in rotational speeds $\Delta V$ between the front and rear wheels is determined according to the following relation.

$$\Delta V=(V_1+V_2-V_3-V_4)/2 \quad (2)$$

The routine proceeds to step 500 wherein the steering controller reads the braking operation signal $S_{BK}$ derived from the braking operation sensor 26. The routine then proceeds to decision step 600 wherein a determination is made as to whether the braking operation signal represents a level 'H' or not, or to determine whether a braking system is operating or not. If there is no braking operations, the routine proceeds to step 700 wherein a correction $\Delta K$ for calculation of a rear wheel steering angle, as will be described hereinafter in detail, is determined based on the difference in rotational speeds between the front and rear wheels derived in step 400. For instance, a preselected table as shown in step 700 can be used. In this table there is a curve defined by a parameter which varies dependent upon variation in the rotational speed difference $\Delta V$ or slips of the driven wheels to obtain a greater value of the correction $\Delta K$ as $\Delta V$ increases. After the correction $\Delta K$ is obtained, the routine proceeds to step 800 wherein a rear wheel target steering angle $\delta r$ (i.e., a corrected angle) is mathematically calculated according to the following equation which includes proportional members (K X $\kappa$) and differential members (T X $\dot{\theta}$).

$$\delta r = KX\theta - TX\dot{\theta} \quad (3)$$

where
K: K'−$\Delta$K
K': a coefficient of a reference characteristic of rear wheel steering variable according to vehicle speed
$\theta$: a steered angle of a steering wheel
$\dot{\theta}$: steering angular velocity of a steering wheel
T: a coefficient variable dependent upon the vehicle speed The rear wheel target steering angle $\delta r$ is obtained by substracting a value (T X $\dot{\theta}$) corresponding to the steering angular velocity $\dot{\theta}$ (d$\theta$/dt) from a value given by multiplying the steered angle $\theta$ at that time by the coefficient K. The coefficient K increases as vehicle speed increases while the coefficient T decreases in response to increases in the vehicle speed which is defined by measurement based on the type of vehicle.

The correction $\Delta K$ is used for correcting the K of the proportional members (K X $\theta$). For example, a large $\Delta K$ is provided, the proportional member (K X $\theta$) is decreased (or becomes minus) to provide a rear wheel steering angle $\delta_r$ in a phase opposite to a steered angle of the front wheels. In the case of a front-wheel drive (FWD) vehicle, an increase in driven wheel slip (increase in the $\Delta V$) during turns causes drift-out which directs the front wheels (i.e., the driven wheels) toward the outside of a turning radius, to cause understeering. Provision of the opposite phase rear wheel steering angle $\delta_r$ can however improve yawing torque response to direct a steering characteristic to "neutral steering" (or to small oversteering) for emphasizing steering response.

If a YES answer is obtained in step 600, the routine directly proceeds to step 800 passing over step 700 so there is no renewal of the correction ΔK. Therefore, the correction value ΔK is held at the value it had, just the before braking operation. As a result, even if any of the wheels lock during the braking operation, causing braking slips, no change is made of the rear wheel steering angle δ_r due to the braking slips, resulting in improved turning stability.

Figure 3:
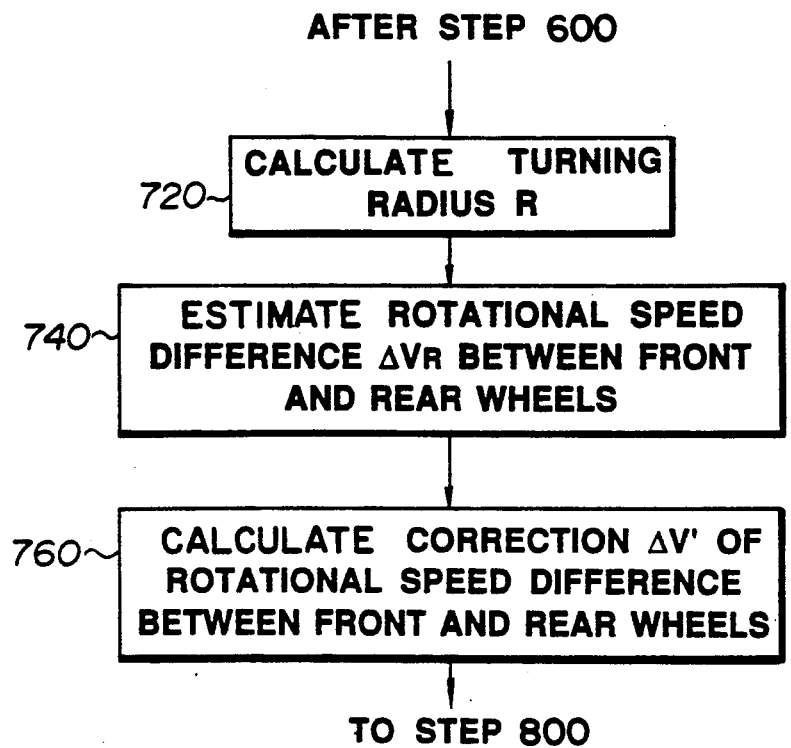
FIG. 3 is a flowchart of alternate processes for calculating a correction for a rear wheel steering angle carried out by a rear wheel steering control system of the invention.

FIG. 3 is a flow diagram of an alternate program for calculating the correction ΔK for the rear wheel steering angle. The difference in rotational speeds ΔV between the front and rear wheels obtained by the above equation (2) includes a first component representing the difference in rotational speeds between the front and rear wheels (referred to as $\Delta V_1$ hereinafter) which corresponds to slippage of the driven wheels caused by acceleration during turning and a second component representing the difference in rotational speeds between the front and rear wheels (referred to as $\Delta V_2$) caused by the difference in turning radii therebetween. The value of $\Delta V_2$ tends to affect the rear wheel steering control greatly when turning with a minimum turning radius when there is a large difference in turning radii between the front and rear wheels. Accordingly, to avoid such a drawback, the following processes, as shown in FIG. 3, may be applicable to the calculation for the correction ΔK in place of step 700 as shown in FIG. 2 so that the $\Delta V_2$ component is canceled to correspond the ΔV to the $\Delta V_1$ substantially for ensuring the proper rear wheel steering control.

If a NO answer is obtained in step 600, the routine proceeds to step 720 wherein a turning radius R of the vehicle is calculated according to the following equation.

$$R = (t_r X V)/V_3 - V_4 \quad (4)$$

where $t_r$ is a tread of the vehicle. Subsequently, the routine proceeds to step 740 wherein, based on the turning radius R, the difference in rotational speeds $\Delta V_R$ between the front and rear wheels is estimated; the estimated difference corresponds to $\Delta V_2$. To understand how this estimate is determined, reference is made to the table shown in FIG. 4.

Figure 4:
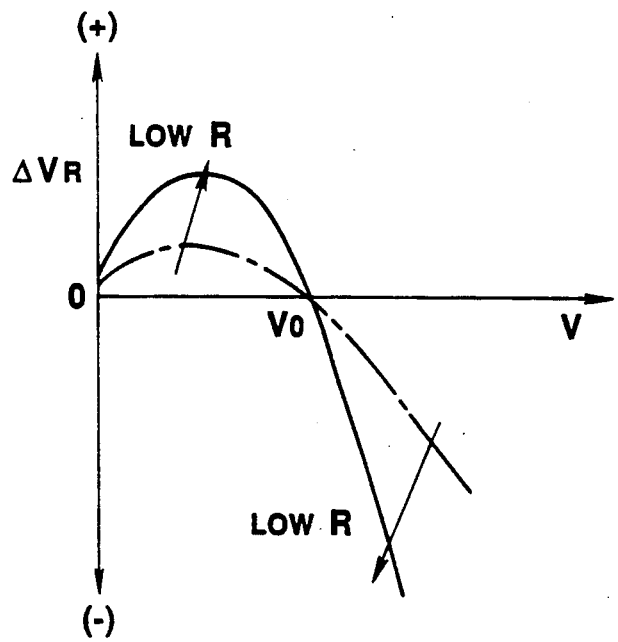
FIG. 4 is a table of the relation between vehicle turning radius R and speed V for estimating the difference in rotational speeds between front and rear wheels $\Delta V_R$.

FIG. 4 provides, an example of how the front-rear wheel rotational speed difference $\Delta V_R$ is estimated according to a relation between the turning radius R and vehicle speed V. In the drawing, the ordinate axis indicates $\Delta V_R$ wherein front wheel rotational speed is greater than rear wheel rotational speed in a range above zero (+) while the rear wheel rotational speed is greater than the front wheel rotational speed in a range below zero (−). The abscissa axis indicates vehicle speed V which increases toward the right. Curves as indicated by solid and broken lines show characteristics with possible minimum turning radius and maximum turning radius respectively. The curves are in a plus range for values of $\Delta V_R$ below the vehicle speed $V_0$ while these are in a minus range for values of $\Delta V_R$ above $V_0$. This is caused by longitudinal displacement of the turning center O of the vehicle dependent upon variations in the vehicle speed V with the result that the front wheel rotational speed increases faster than the rear wheel rotational speed at low speed while it decreases slower at high speeds. The values of $\Delta V_R$ derived by the curves in FIG. 4 are represented by the following equation.

$$\Delta V_R = V X \ell / R^2 X (m X V^2 X a / C_{pr} X \ell - \ell/2) \quad (5)$$

where m is vehicle weight, $C_{pr}$ is cornering power of the rear wheels, $\ell$ is vehicle wheel base, and the a is the distance between the center of gravity and a point intermediate the front wheels.

After determining the $\Delta V_R$, routine proceeds to step 760 wherein a corrected front-rear wheel rotational speed difference ΔV' is calculated. This calculation is implemented by subtracting ΔV as obtained by step 400, by $\Delta V_R$, as obtained by step 740 as shown by the following relation.

$$\Delta V' = \Delta V - \Delta V_R \quad (5)$$

After obtaining the ΔV', the correction ΔK is determined according to table as shown in step 700 in FIG. 2 (in the table, the ΔV is replaced with the ΔV'). The routine then proceeds to step 800 in FIG. 2.

With the additional processes, the rotational speed difference between the front and rear wheels ΔV is subtracted by the rotational speed difference component $\Delta V_R$ obtained by the turning radii difference dependent upon the turning radius R to correct the proportional members (K X θ) of the rear wheel steering equation (3) utilizing the resultant value (ΔV'). Thus, the rear wheel steering can be controlled based on the precise amount of driven wheel slip to effectively prevent spin due to acceleration during turning in the case of RWD vehicles and drift-out from occurring in the case of FWD vehicles.

As previously mentioned, a feature of the present invention is that calculation of the correction ΔK, for the rear wheel target steering angle, dependent upon the difference in rotational speeds ΔV between the front and rear wheels is made only when the braking system is not operated and a value of the correction ΔK just before the braking operation is held when the braking system is operated during turns. Thus, the present invention avoids a tendency toward steering instability caused by unsuitable rear wheel steering control due to the difference in rotational speeds between the front and rear wheels (i.e., braking slips) caused by locking of a wheel or wheels when the brake pedal is depressed during turns.

While the above embodiment utilizes the brake lamp switch as the brake operation sensor, an operation signal of an ABS (anti-skid brake system) or a deceleration signal from a front-rear deceleration sensor may be used to detect braking.

Additionally, while the above embodiment is directed to a front-wheel drive vehicle, the invention may be applicable to a rear-wheel drive vehicle wherein K in equation (3) is defined by a relation of K'+ΔK to provide a rear wheel steering angle in the same phase as a steered angle of the front wheels when there are large slips of the driven wheels to prevent a spin from occurring.

What is claimed is:

1. A rear wheel steering control system for a vehicle comprising:
   first means for monitoring a steered angle of front wheels to provide a signal indicative thereof;
   second means for monitoring rotational speeds of wheels respectively to determine a difference in rotational speed between the front and rear wheels and providing a signal indicative thereof;

third means responsive to the signal from said second means to determine a correction value for a rear wheel steering angle based on the magnitude of the difference in rotational speed between the front and rear wheels, said third means deriving a rear wheel target steering angle based on the correction value and the steered angle of the front wheels to derive a signal indicative thereof;

fourth means for monitoring braking operation to provide a signal indicative thereof;

fifth means responsive to the signal from said fourth means for stopping the correction value determining operation of said third means to hold the correction value to a value prior to the braking operation; and sixth means for controlling an actual steering angle of the rear wheels according to the rear wheel target steering angle.

2. A system as set forth in claim 1, wherein said first means includes a sensor for detecting a steered angle $\theta$ of a steering wheel to monitor the steered angle of the front wheels and steering angular velocity $\dot{\theta}$ of the steering wheel, said third means deriving the rear wheel target steering angle $\delta_r$ according to the following relation, $$\delta_r = KX\theta - TX\dot{\theta}$$

where
$K = K' - \Delta K$
$K' =$ a coefficient of a reference characteristic for the rear wheel steering variable according to vehicle speed
$\Delta K =$ the correction determined by said third means
$T =$ a coefficient dependent on the vehicle speed.

3. A system as set forth in claim 2, wherein the correction $\Delta K$ is defined by a parameter which increases with increases in the difference in rotational speed $\Delta V$ between the front and rear wheels.

4. A rear wheel steering control system for a vehicle comprising:

first means for detecting a steered angle of front wheels to provide a signal indicative thereof;

second means for monitoring rotational speeds of wheels to determine vehicle speed and a difference in rotational speed between the front and rear wheels caused by driven wheel slippage to a road surface and providing signals indicative thereof;

third means responsive to the signals from said first and second means to determine a rear wheel steering angle in a preselected relation to the steered angle of the front wheels and the vehicle speed;

fourth means responsive to the signal from said second means to determine a correction value for the rear wheel steering angle determined by said third means based on the magnitude of the difference in rotational speeds between the front and rear wheels, said fourth means adjusting the rear wheel steering angle based on the correction value to provide a rear wheel target steering angle and providing a signal indicative thereof;

fifth means for monitoring braking operation to provide a signal indicative thereof;

sixth means responsive to the signal from said fifth means to hold the correction value to a value prior to the braking operation during braking; and seventh means for controlling an actual steering angle of the rear wheels according to the rear wheel target steering angle.

5. A system as set forth in claim 4, wherein said fifth means is provided with a brake switch lamp response to depression of a brake pedal.

6. A system as set forth in claim 4, wherein said first means includes a sensor for detecting a steered angle $\theta$ of a steering wheel to monitor the steered angle of the front wheels and steering angular velocity $\dot{\theta}$ of the steering wheel, said fourth means deriving the rear wheel target steering angle $\delta_r$ according to the following relation, $$\delta_r = KX\theta - TX\dot{\theta}$$

where
$K = K' - \Delta K$
$K' =$ a coefficient of a reference characteristic of rear wheel steering variable according to vehicle speed
$\Delta K =$ the correction determined by said fourth means
$T =$ a coefficient dependent on the vehicle speed.

7. A system as set forth in claim 6, wherein the correction $\Delta K$ is a parameter which increases as there are increases in the difference in rotational speeds $\Delta V$ between the front and rear wheels.

8. A system as set forth in claim 4, wherein said sixth means is responsive to the signal from said fifth means to cancel correcting operation carried out by said fourth means.

9. A system as set forth in claim 4, wherein said second means includes speed sensors, each of which determines rotational speed of a wheel, to calculate the difference in rotational speeds $\Delta V$ between the front and rear wheels, vehicle speed and a turning radius, said fourth means calculating a component of a difference in rotational speeds $\Delta V_R$ between the front and rear wheels caused by a difference in turning radii therebetween based on the vehicle speed and the turning radius to determine a difference in rotational speeds $\Delta V'$ given by canceling the difference in rotational speeds $\Delta V_R$ from the difference in rotational speeds $\Delta V$, said fourth means determining the correction $\Delta K$ based on the magnitude of the difference in rotational speeds $\Delta V'$.

10. A system as set forth in claim 9, wherein said first means includes a steering wheel sensor for detecting a steered angle $\theta$ of a steering wheel to monitor the steered angle of the front wheels and steering angular velocity $\dot{\theta}$ of the steering wheel, said fourth means deriving the rear wheel target steering angle $\delta_r$ according to the following relation, $$\delta_r = KX\theta - TX\dot{\theta}$$

where
$K = K' - \Delta K$
$K' =$ a coefficient of a reference characteristic of rear wheel steering variable according to vehicle speed
$\Delta K =$ the correction calculated by said fourth means
$T =$ a coefficient dependent on the vehicle speed.

11. A method of controlling rear wheel steering angle of a vehicle having manually controlled front wheel steering and brakes for front and rear wheel sets, comprising (1) determining indications of (a) the difference in rotational speeds of the front and rear wheel sets, (b) the vehicle speed, and (c) steering angle of the front wheel set, (2) determining rear wheel target steering angle in response to functions derived from the determined indications of (b) and (c) as well as a correction factor based on indication (a), and (3) controlling the steering angle of the rear wheel set in response to the target steering angle in substantially a real time basis as determined during step (2) except when the wheel sets are being braked at which time the steering angle is controlled in substantially a real time basis in response to the functions derived from the determined indications of (b) and (c) and the correction factor based on indication (a) as it existed immediately prior to the wheel sets being braked.

12. The method of claim 11 wherein target steering angle is determined as $$K\theta - T\dot{\theta}$$

where
- $\theta$ is determined by indication (c),
- $\dot{\theta}$ is the time rate of change of determined indication (c),
- T is a function of vehicle speed, and
- K is a function of vehicle speed and the correction factor.

13. The method of claim 11 wherein the correction factor is determined by determining vehicle turning radius, estimating the rotational speed difference between the front and rear wheel sets in response to determined vehicle turning radius and vehicle speed, determining the deviation of the estimated rotational speed difference from monitored values for the difference between the rotational speeds of the front and rear wheel sets; and determining the correction factor in response to the determined deviation.

14. The method of claim 13 wherein turning radius is determined from vehicle speed and the deviation of the rotation speed of the wheels of one of the wheel sets.

15. A method of controlling rear wheel steering angle of a vehicle having manually controlled front wheel steering and brakes for front and rear wheel sets, one of said wheel sets being driven by a power plant of the vehicle, the other of said wheel sets being a compliance set, the method comprising (1) normally controlling the rear wheel set steering angle in response to indications of (a) the front wheel set steering angle, (b) vehicle speed and (c) a variable correction value dependent on the difference in rotational speed between the front and rear wheel sets caused by slippage of the driven wheel set, and (2) during braking controlling the rear wheel set steering angle in response to indications of the front wheel steering angle and vehicle speed on a substantially real time basis and the same correction value that was controlling rear wheel steering angle immediately prior to braking.

16. The method of claim 15 wherein the correction factor is determined by determining vehicle turning radius, estimating the rotational speed difference between the front and rear wheel sets in response to determined vehicle turning radius and vehicle speed, determining the deviation of the estimated rotational speed difference from monitored values for the difference between the rotational speeds of the front and rear wheel sets; and determining the correction factor in response to the determined deviation.

17. A method of controlling a rear wheel steering unit of a vehicle having a front set of wheels, a rear set of wheels and a manually responsive steering controller for the front wheel set, one of said sets of wheels being driven by a power plant of the vehicle and the other wheel set being a compliance set, the method comprising detecting rotational speeds of the front and back wheel sets, detecting the front wheel set steering angle, deriving a first parameter having a value corresponding to wheel slippage of the driven wheel set caused by acceleration during turning and a second parameter representing the difference in turning radii of the front and rear wheel sets in response to the detected rotational speeds of the front and back wheel sets, normally controlling the rear wheel set steering angle by combining indications of the first and second parameters with the detected front wheel set steering angle so spin or drift out is substantially prevented in the presence of wheel slip of the driven wheel set, the first and second parameters being derived so there is a variable correction value for the rear wheel set steering angle dependent on the difference in rotational speeds between the front and rear wheel sets caused by slippage of the driven wheel set, and controlling the rear wheel set steering angle during braking in response to indications of the front wheel steering angle and vehicle speed on a substantially real time basis and the same correction value that was controlling rear wheel steering angle immediately prior to braking.

18. A method of controlling rear wheel steering angle of a vehicle having manually controlled front wheel steering and brakes for front and rear wheel sets, one of said wheel sets being driven by a power plant of the vehicle, the other of said wheel sets being a compliance set, the method comprising (1) normally controlling the rear wheel set steering angle in response to indications of (a) a vehicle operating parameter and (b) a variable correction value dependent on slippage of the driven wheel set, and (2) during braking controlling the rear wheel set steering angle in response to indications of the vehicle operating parameter on a substantially real time basis and the same correction value that was controlling rear wheel steering angle immediately prior to braking.

* * * * *